United States Patent [19]

Turner

[11] Patent Number: 5,098,179
[45] Date of Patent: Mar. 24, 1992

[54] LCD ASSEMBLY WITH EASILY INSTALLED FILTER

[75] Inventor: Winfield F. Turner, Greensboro, N.C.

[73] Assignee: Gilbarco, Inc., Greensboro, N.C.

[21] Appl. No.: 583,029

[22] Filed: Sep. 14, 1990

[51] Int. Cl.⁵ .......................... G02F 1/13; G02B 7/00; G01D 11/28; B60Q 1/06
[52] U.S. Cl. ........................................ 359/68; 362/23; 362/373; 359/71; 359/83; 359/892
[58] Field of Search ................... 350/331 R, 334, 318, 350/334, 339 F; 362/345, 294, 373, 23

[56] References Cited

U.S. PATENT DOCUMENTS

| | | | |
|---|---|---|---|
| 4,111,533 | 9/1978 | Nakamura et al. | 350/334 X |
| 4,139,272 | 2/1979 | Laesser et al. | 350/337 |
| 4,196,973 | 4/1980 | Hochstrate | 350/338 |
| 4,357,061 | 11/1982 | Crosby | 350/334 X |
| 4,367,467 | 1/1983 | Emile, Jr. | 350/334 X |
| 4,423,927 | 1/1984 | Bly | 350/331 R |
| 4,486,077 | 12/1984 | Torresdal | 350/331 R |
| 4,514,920 | 5/1985 | Shafrir et al. | 350/331 R X |
| 4,616,295 | 10/1986 | Jewell et al. | 362/311 |
| 4,756,105 | 7/1988 | Wagner et al. | 350/334 X |
| 4,796,977 | 11/1988 | Drake | 350/331 R |
| 4,813,642 | 3/1989 | Matsui | 350/334 X |
| 4,823,245 | 4/1989 | Leverte | 350/318 X |
| 4,929,062 | 5/1990 | Guzik et al. | 350/345 |

Primary Examiner—John S. Heyman
Assistant Examiner—Ron Trice
Attorney, Agent, or Firm—Rhodes, Coats & Bennett

[57] ABSTRACT

A light modifying device for a liquid crystal display mounted on a PC board is provided with a filter and/or reflector of sheet material which is conveniently releasably installed between the liquid crystal display and the PC board to effect alteration of the properties of light passing through the liquid crystal display. Externally originating light which does not pass through the filter is reflected back to help light the LCD. For this purpose the surface of the filter adjacent the LCD includes a coating that is reflective, as well as light transmissive. The device is provided with securement means for holding the filter in place, but facilitating simple installation and removal.

14 Claims, 4 Drawing Sheets

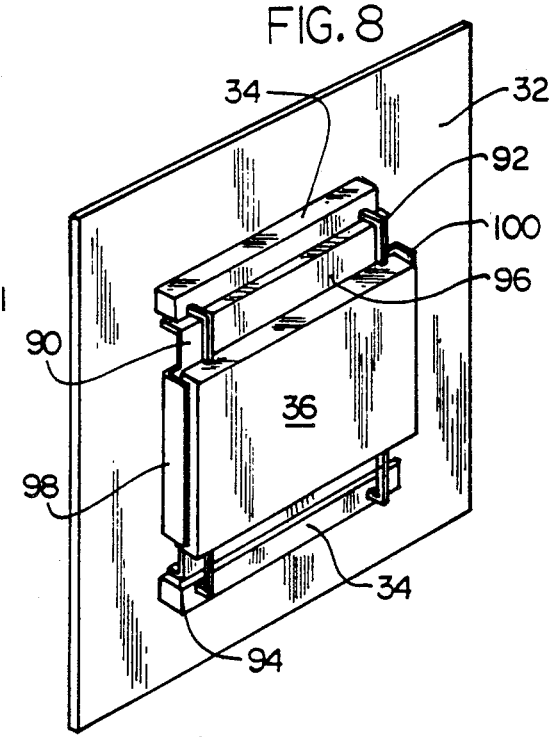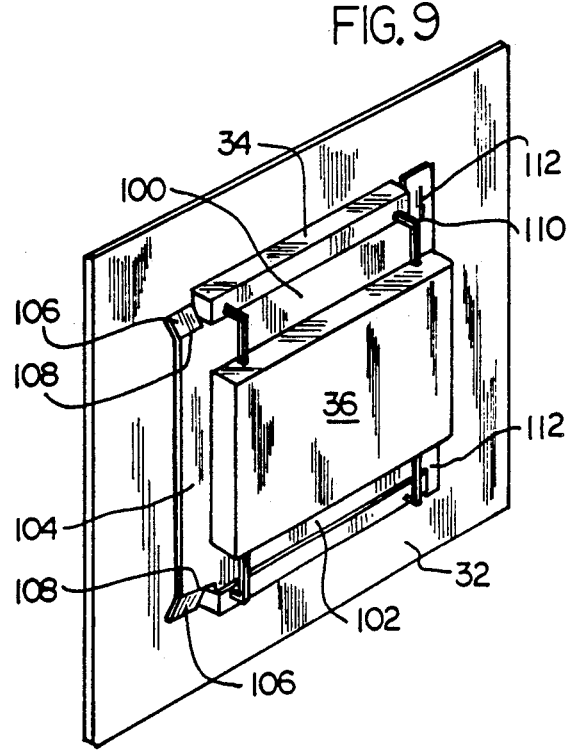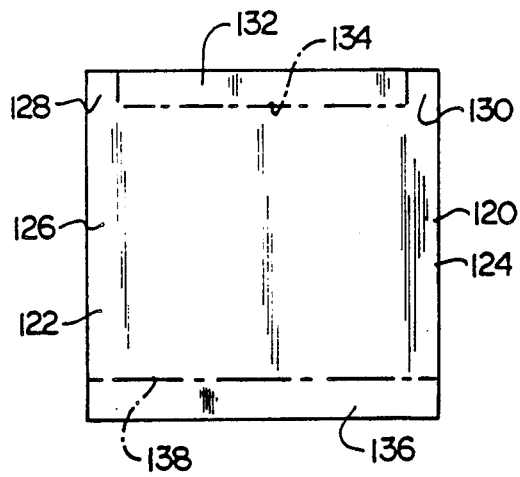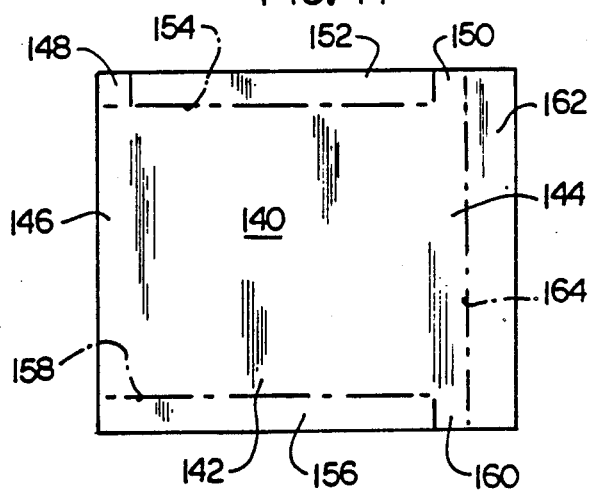

LCD ASSEMBLY WITH EASILY INSTALLED FILTER

BACKGROUND OF THE INVENTION

The present invention relates to liquid crystal displays which are capable of transmitting light in selected portions as controlled by an electronic circuit in which the properties of the transmitted light are selected by the selective interposition of a light modifying device between the light source and the liquid crystal display (hereinafter LCD).

LCD's are known with backlighting arrangements and with filters, such as is shown in U.S. Pat. No. 4,486,077 to Torresdal in which an optional color filter is interposed between a light control block and an LCD mounted on a printed circuit board. However, the filter is merely held in place by being sandwiched between those elements. As such, it may be difficult to replace the filter, or to selectively install a filter during assembly, when desired.

In particular, in the manufacture of fuel dispensers in which elements such as the price per gallon, number of gallons delivered, and transaction price based upon the number of gallons delivered need to be displayed to a purchaser of fuel, it has become known to use such LCD's. It is considered desirable to provide such LCD's illuminated in colors to coordinate with the marketing color scheme of the fuel vendor. Thus, in the manufacture of such fuel dispensers, it is desirable to have such filter elements capable of easy installation as required from an existing inventory of filters into an existing inventory of LCD-equipped dispensers.

Further, in addition to or as an alternative thereto, it is sometimes helpful to provide a reflective surface behind an LCD to improve the visibility thereof in certain daylight conditions. So arranged, the reflective surface captures ambient light rays and reflects them through the LCD to improve the visibility thereof.

Clearly, changing the filter disclosed in the Torresdal patent would require excessive disassembly and initial or subsequent filter installation would take additional time and may result in damage to the LCD. There is need in the art for an LCD filter and/or reflector which can be easily and quickly installed and yet which stays in its installed position despite the vibration involved in transport to an installation site.

SUMMARY OF THE INVENTION

The present invention fulfills this need by providing a backlit liquid crystal display assembly including a board on which a liquid crystal display is mounted, an opening in the board in alignment with the liquid crystal display, a backlight for shining light through the opening in the display and a light modifying panel interposed between the board and the display to reflect light or to transmit light of a selected characteristic through the liquid crystal display, the light modifying panel having securement means for securing the panel between the board and the liquid crystal display. Preferably the panel is a sheet material and the securement means includes outwardly extending tabs from the sheet material.

The invention is particularly suited for situations where the board has pin sockets on two opposed sides of the opening and the liquid crystal display has pins which are inserted in the sockets so that the liquid crystal display straddles the opening. The invention is also contemplated in embodiments in which the pins are soldered directly into the PC board at the same general location. In such a case, the panel is desirably a stiff sheet material having a pair of opposed edges downwardly turned toward the board adjacent the pin sockets to engage the board and pins and urge the panel toward the liquid crystal display. An additional pair of opposed edges upwardly turned into the plane of the liquid crystal display restrains movement of the panel parallel to the liquid crystal display.

In another embodiment, the filter is a stiff sheet material having a leading end, a midsection and a trailing end, the midsection being narrower than the inside distance between the pin sockets and the leading and trailing ends being wider than such distance. Desirably, the leading end has portions wider than the mid-section connected by a resilient bend so that the portions can be bent inwardly to facilitate insertion and withdrawal of the panel between the board and the liquid crystal display. More preferably, the liquid crystal display is spaced from the board by a gap and the portions of the leading end extend toward the pin sockets beyond the midsection by a distance less than the gap.

In another embodiment, the panel includes a rectangular, stiff sheet material slightly wider than the inside distance between the pin sockets. A first edge of the panel adjacent one pin socket is outwardly turned toward the board along a resilient bend parallel to the first edge. A second edge of the panel adjacent another pin socket has a leading end, a trailing end and a midsection, with divisions separating the forward end from the midsection and the midsection from the trailing end, with the midsection downwardly turned toward the board along a resilient bend parallel to the second edge. Portions of the leading and trailing ends extend outwardly as tabs in alignment with the pin socket. In yet another embodiment, the filter further includes an extension on the trailing end and the first edge has a division aligned with the division between the midsection and the trailing end of the second edge, and the extension has a resilient bend transverse to the first and second edges and downwardly turned toward the board.

One of the characteristics of the light which is altered by the light modifying panel is the color of the light. The material of the filter is preferably Lexan polycarbonate film, manufactured by GE Plastics, General Electric Company, Pittsfield, Massachusetts. The polycarbonate film is coated with a substance that is light reflective in addition to being light transmissive.

BRIEF DESCRIPTION OF THE DRAWING

The invention will be better understood by a review of the following detailed description along with a study of the drawings in which:

FIG. 8 is a front perspective view illustrating an LCD mounted on a printed circuit board and provided with an interposed filter;

FIG. 9 is a view similar to FIG. 7, but with a different embodiment of the filter;

FIGS. 10 and 11 are schematic views of alternative filter embodiments.

DETAILED DESCRIPTION OF THE PREFERRED EMBODIMENTS

Figure 6:
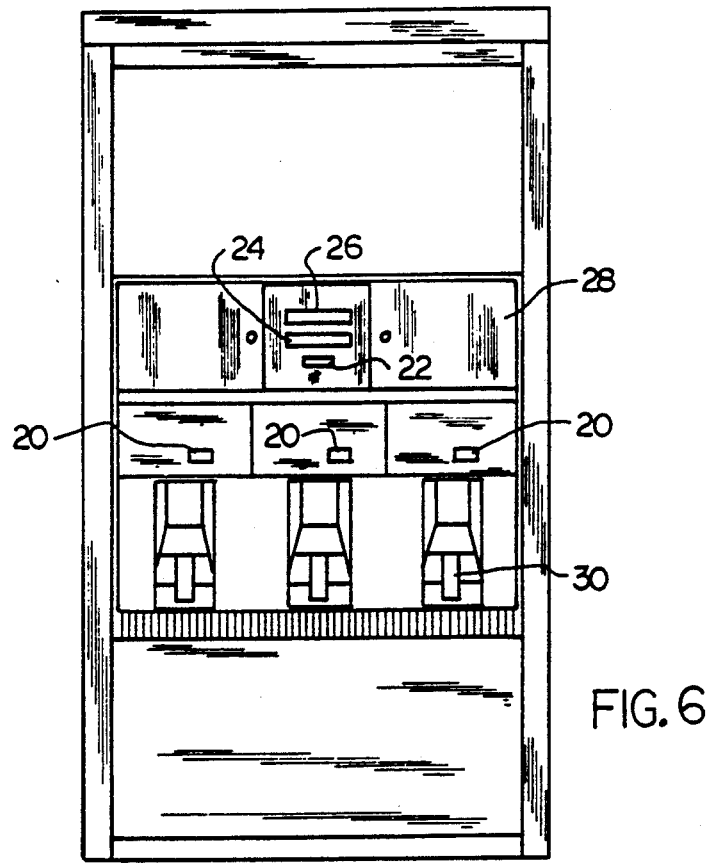
FIG. 6 is an elevation view of a fuel dispenser provided with a multiplicity of LCD's according to the present invention.

As can best be seen with reference to FIG. 6, a fuel dispenser housing 28 is provided with conventional fuel dispensing hoses and nozzles (not shown), the nozzles of which may be positioned on nozzle cradles 30. The housing is provided with read-outs to the customer. These include a price per gallon read-out 20 for each of three different grades of gasoline, a price per gallon read-out 22 for a selected grade of gasoline, and volume read-out 24 of the number of gallons in a particular transaction, and a total sale readout 26 indicating the amount due for a particular transaction. The present invention provides a means for making the various read-outs 20,22,24,26 of an LCD construction with effective backlighting.

The read-outs 20, 22, 24 and 26 are connected by conventional pin sockets to computation means of any desirable arrangement for providing the electronic signals to the LCD's of the read-outs to cause them to assume the transmissivity modes required to display the required information. The present invention focuses on providing suitable backlighting for these LCD's to make the displayed information visible to a user of the fuel dispenser.

Figure 3:
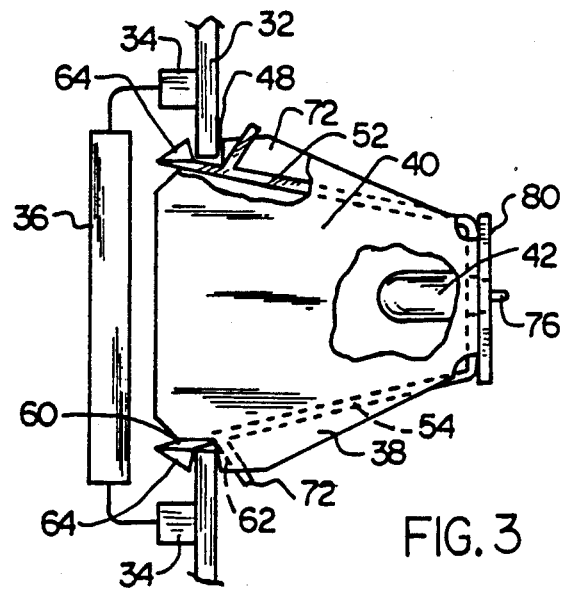
FIG. 3 is side elevation view partially broken away of the reflector of FIG. 1 as installed with a light source and installed on a printed circuit board.

As seen in FIG. 3, a display PC board 32 is provided as part of the fuel dispenser housing 28, generally inwardly of the outer housing 28. In fact, the board 32 is usually mounted on a protective plastic lens (not shown) through which the read-out is visible.

The PC board 32 is preferably provided with LCD mounting sockets 34 into which the pins of an LCD 36 are mounted in conventional fashion. While pin sockets 34 are used in the illustrated embodiment, it should be recognized that the display pins could be soldered directly into the PC board. It should be noted that the two LCD mounting sockets 34 are arrayed on opposite sides of an opening 48 in the PC board so that the LCD 36 straddles the opening when its two opposed sets of pins are mounted in the mounting sockets.

A backlight assembly 38 is provided to engage the opening 48 and includes a reflector 40, a backlight PC board 80, and an incandescent light bulb 42. While an incandescent lamp 42 is specified, it should be recognized that other types of light sources such as, for example, neon and LED are also contemplated.

Figure 1:
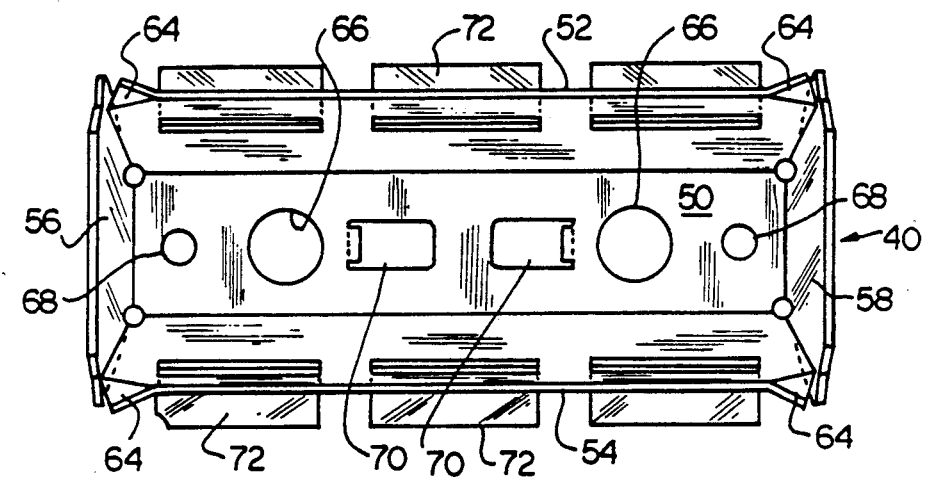
FIG. 1 is a front elevation view of a reflector for use in the present invention.
Figure 2:
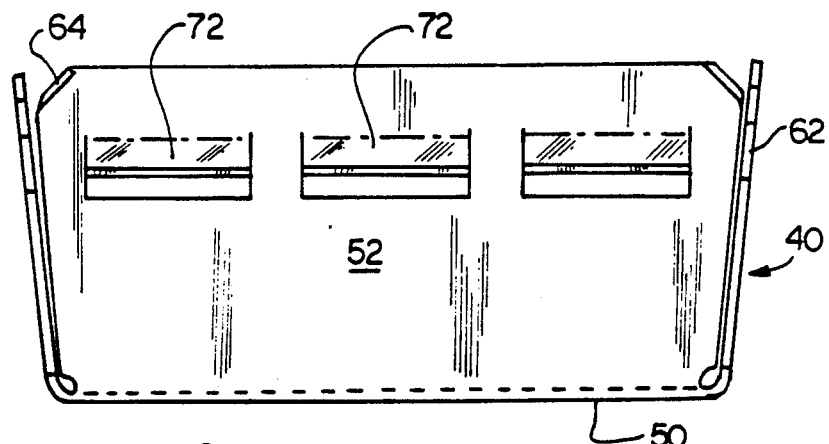
FIG. 2 is a top view of the reflector of FIG. 1.
Figure 7:
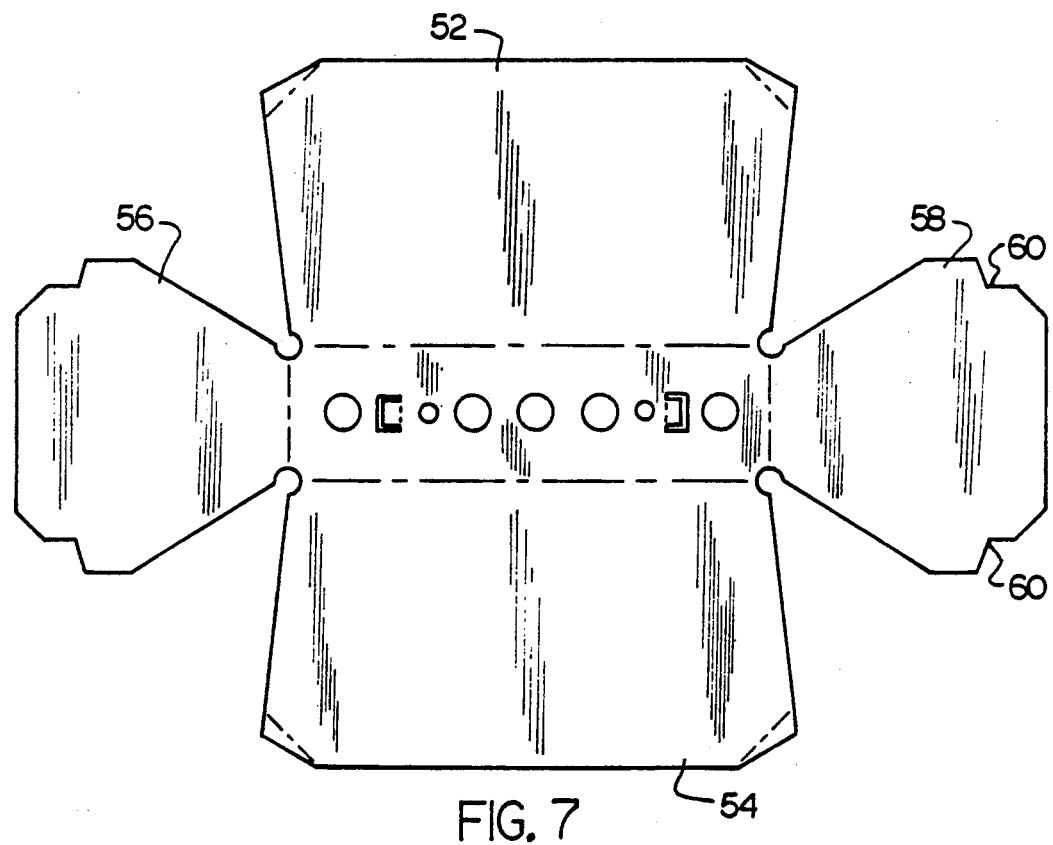
FIG. 7 is a plan view of a piece of sheet material adapted to be made into a reflector.

The reflector 40 is best seen in FIGS. 1 and 2. The reflector 40 is provided with a back wall 50, and upper wall 52, a lower wall 54, and side walls 56 and 58. Preferably, the reflector 40 is made of a piece of sheet material, such as thin steel and cut out with slots separating the upper, lower and side walls, followed by bending those walls into the position shown in FIGS. 1-3. A plan view of the sheet material before bending is shown in FIG. 7. Other materials including, but not limited to, aluminum, plastic or cardboard could be substituted. As illustrated, upper wall 52, lower wall 54 and side walls 62 preferably incline outwardly and forwardly from back wall 50. So arranged, and because the inner surface of the reflector is highly reflective and non-specular, ambient light rays entering the front of opening 48 are captured and reflected forwardly through the liquid crystal display.

Referring again to FIG. 3, the side walls 56,58 are provided with notches 60 so that the reflector 40 may be installed in the opening 48 with a portion of the side walls 56,58 extending through the opening to the forward side of the PC board 32. The resulting shoulders 62 help to firmly position the side walls 56,58 properly against the back of the PC board surrounding opening 48.

The upper and lower walls 52,54 are provided with dog ears 64 which, as can be seen in FIG. 3, secure the reflector 40 against the PC board 32.

Since the upper walls 52,54 are provided inwardly of the side walls 56,58, such that the side edges of the side walls are somewhat parallel to the upper and lower walls, the upper and lower walls may be compressed inwardly. Such inward compression reduces the distance spanned by the dog ears 64 of the opposed upper wall 52 and lower wall 54 from their normal configuration and permits the dog eared edges of the upper and lower walls 52,54 to be inserted from the rear, forwardly through the opening 48. Release of such compression after such insertion permits the walls to open so that the dog ears are lodged forwardly of the PC board 32.

As can be seen in FIGS. 1, 2 and 3, the upper wall 52 and lower wall 54 are provided with louvers 72. The louvers 72 are formed by cutting out three sides of a tab, leaving a fourth side integral with the walls 52,54. These louvers are provided for ventilation purposes, as will be described further hereinafter.

Referring again to FIG. 1, the back wall 50 is provided with large openings 66, small openings 68, and voids 70 caused by lifted tabs 76. The large openings 66 are provided for the insertion from the rear of incandescent light sources.

Figure 4:
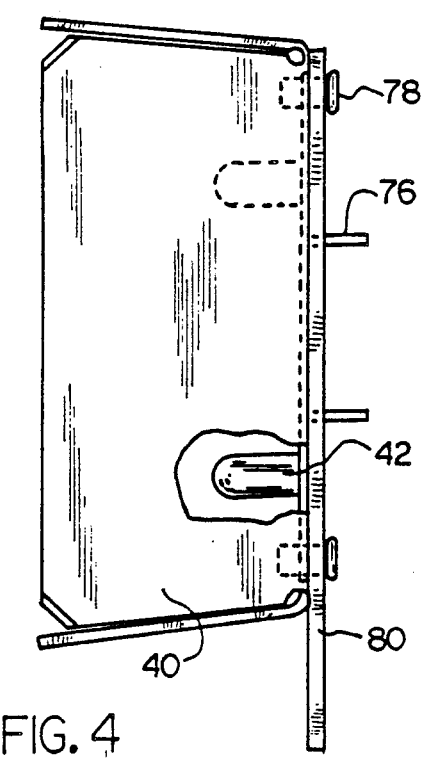
FIG. 4 is a top view of the reflector partially broken away with the light source installed.
Figure 5:
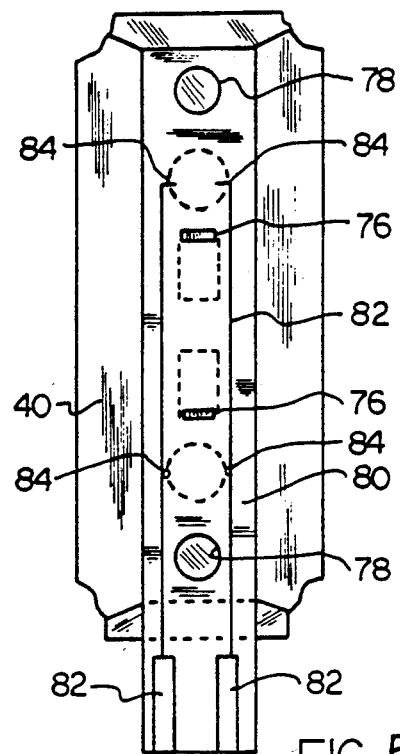
FIG. 5 is a rear elevation view of the reflector with the light source installed.

FIGS. 5 and 6 illustrate the mounting of the incandescent lamps to the reflector 40. The lamps 42 are mounted first to a board 80 having conductors 82 formed thereon in conventional PC board fashion. The lamps 42 are desirably soldered at 84 to the conductors 82 to make electrical connections, but other connections may also be used. The lamps 42 extend through the holes 66 in the back wall 50, and the tabs 76 lifted out of the voids 70 in the back wall pass through cooperating holes in the PC board 80. Alternatively, rivets 78 can be provided through the board 80 and small openings 68 in the back wall 50. Other means of securing the board to the back wall may, of course, be substituted. The conductors 82 connect to edge connectors (not shown) as is conventional, whereby a power source supplies electrical power to the lamps 42. In the embodiment shown in FIGS. 4 and 5, the louvers 72 have been omitted for the sake of clarity. In addition, the notches 60 and dog ears 64 have been broken away in FIG. 5 for ease of illustration.

In operation, the apparatus shown in FIG. 5 is supplied from the factory equipped with fresh lamps 42, with the board 80 secured to a reflector 40 by means of rivets 78 or twisted tabs 76. When the lamps in a fuel dispenser housing 28 need replacement, the dispenser housing is opened so that access to the rear of PC board 32 may be had. The connector on the existing board 80 is disconnected, the upper and lower walls 52,54 are compressed to cause the dog ears 64 to clear the opening 48 and the backlight assembly 38 is withdrawn rearwardly. This assembly can be either disposed of or reconditioned, as desired. The fresh backlight assembly 38 is installed in place of the removed assembly by compressing its upper and lower walls 52,54 to cause the dog ears 64 to span a distance that will clear the opening 48. The fresh backlight assembly 38 is then inserted into the opening so that the shoulders 62 engage the back of the PC board 32 and the walls 52,50 are released so they spring outwardly toward the PC board 48. The edge connector is then connected to the conductors 82 to enable the lamps 42 to be illuminated as desired. Thus, when the lamp 42 burns out, it can be easily replaced by field personnel.

Heat Handling

As can be appreciated, the incandescent lamps 42 give off not only light but also heat and, it is known that LCD's 36 are subject to premature failure at high temperature. This is particularly true when a multiplicity of LCD backlights are provided, as the LCD's 20,22,24,26 are in the dispenser of FIG. 6. The problem is particularly acute for the upper ones 24,26 of the LCD's since heat from the lower LCD's 20,22 and other heat-generating components rises to their level.

Accordingly, in order to take away excess heat from the reflector assembly 38, ventilation ports in the form of louvers 72 are provided. The louvers 72 are provided as lifted tabs from the upper and lower side walls of generally horizontally elongated configuration spanning a majority of the width of the upper and lower walls. The louvers serve as chimneys, establishing a convection airflow in through the lower louvers and out through the upper louvers, thereby pulling in cooler air and discharging warmer air. It has been found in laboratory evaluations that the provision of these louvers can reduce the operating temperature of the LCD by about 6° C., a significant reduction which materially enhances the operating life of the LCD 36.

The particular louver arrangement shown is preferred in that the lifting of the louvers and leaving them attached at the forward edges causes the louver to be oriented to reflect light which might otherwise exit from the reflector assembly 38 back into the reflector assembly where it may be directed usefully through the opening 48. Completely removing the tab or connecting it by its rearward edge do not so advantageously reflect the light inward to the reflector.

Also, since the reflector is made of metal, it is a good conductor of heat, and heat from the reflector is conducted into the lifted louver 72 where it is exposed to the moving airflow. This heat can be conducted and/or radiated from the lifted louvers 72, further enhancing the cooling effect.

A further improvement in the reflector 40 to assist this effectiveness is to provide the interior of the reflector of a white color to enhance its reflectivity and to provide its outer shell as dark as possible, preferably black, to increase its ability to radiate heat away from the reflector assembly.

The adverse effect of the incandescent lamp heating is thereby reduced to an acceptable level.

Light Modifying Panel

The light output from the incandescent lamp 42 generally spans a broad visible spectrum and it is often desirable to highlight the LCD by displaying it in a particular color. Accordingly, as seen in FIGS. 8, 9, 10 and 11, various filter arrangements can be provided to restrict the light passing through the LCD 36 to a desired color. Also it may be desirable to improve the visibility of the LCD by reflecting ambient light rays back through the LCD.

As seen in FIG. 8, a view from the front side of the display, a light modifying panel 90 is interposed between the display board 32 and the LCD 36. The filter 90 is preferably a stiff sheet material such as polycarbonate. One source of such materials is Lexan, a product of GE Plastics, General Electric Company, Pittsfield, Massachusetts. Other filter materials may be substituted. The surface of panel 90 adjacent LCD 36 is provided with a coating that is light reflecting in addition to being light transmissive. That is, light from outside the fuel dispenser that enters through the LCD is reflected back through the LCD to illuminate it, adding to the light from the incandescent source in providing illumination. The panel 90 is generally rectangular, but is also provided with downwardly turned upper and lower edges 92,94 which urge the main plane 96 of the panel into close proximity to the LCD 36. The upper edge 92 and lower edge 94 turn downward spaced from one another a distance slightly less than the internal distance between the pin sockets. Left and right edges 98,100 extend forwardly, just a bit wider than the LCD 36.

Thus, the panel is restrained against movement up or down by sockets 34 and restrained against movement left to right by LCD 36. Installation of this panel 90 requires removal of the LCD 36 from the pin sockets 34, placement of the filter between the sockets 34 and reinstallation of the LCD 36. It is important that the panel be retained snugly in place as close to the LCD as possible. Various approaches to retaining the panel in position are possible. Several are discussed in detail hereinbelow.

In the embodiment shown in FIG. 9, the panel 100 is provided largely in one plane with a mid-section 102. A leading end 104 has tabs or barbs 106 extending above and below the distance between the sockets 34, resiliently bent at 108. A trailing end 110 has similar tabs 112, but these are not resiliently bent. This embodiment can be installed without the need to remove the LCD 36 from the sockets 34. An old panel can be removed by bending in the tabs 106 and withdrawing the filter 100 to the right in the view of FIG. 9. A new filter may be installed by folding the tabs 106 on the leading end 104 under the panel 100, inserting the panel between the LCD 36 and board 32 until tabs 112 on the trailing end 110 contact the sockets 34, whereupon the resiliently bent barbs 106 will open to hold the panel 100 in place and prevent its withdrawal. As will be appreciated, the mid-section 102 can be provided with resiliently bent protrusions on its upper and lower edges, similar to barbs 106, to help to hold the panel 100 close to the LCD 36.

An alternative embodiment is shown in FIG. 10, in which panel 120 is provided with a mid-section 122, a leading end 126, and a trailing end 124. The leading end 126 is provided with an upwardly extending tab 128, the mid-section 122 is provided with an upwardly extending flap 132 resiliently bent at 134 and the trailing end 124 is provided with a upwardly extending tab 130. The entire length of the panel 120 is provided with a lower flap 136 resiliently bent at 138. (Actually, in this embodiment, either end may function as the "leading"

end.) The lower flap 136 is resiliently bent to narrow the width of the panel 120 for insertion between an LCD 36 and display board 32 until the tabs 128,130 extend past the end points of the upper socket 34, at which point the panel can move vertically to resiliently bend the flap 132 and cause the lower flap 136 to become somewhat less bent. Thus, the panel 120 is wedged between the upper and lower sockets 34 and held in place laterally by the tabs 128,130. As will be appreciated, the panel 120 could just as easily be inserted upside-down from that described hereinabove.

In the embodiment shown in FIG. 11, a panel 140 is provided with a mid-section 142, a leading end 146, and a trailing end 144. The leading end is provided with an upper tab 148, the mid-section is provided with a flap 152 resiliently bent at 154, and the trailing end 144 is provided with an upper tab 150 and lower tab 160. The remainder of the lower edge is provided with a lower flap 156 resiliently bent at 158. The lower tab 160 and upper tab 150 are generally coplanar with the upper tab 148 and mid-section 142, but a trailing flap 162 is downwardly bent at a resilient bend 164.

Installation of the panel in FIG. 11 involves bending the lower flap 156 inwardly to narrow the width of the panel, so that the filter may be inserted between the LCD and the board 32 until tab 160 abuts the pin socket 34. Then, the lower flap 156 can be released outwardly, causing the tabs 148,150 to extend above the lower edge of the socket 34 and flap 152 to be bent downwardly. Thus, the tabs 148,150,160 will abut their respective sockets 34. Trailing flap 162 is provided to extend downwardly toward the display board 32 to filter light coming from that end of the opening before reaching the LCD 36. This embodiment is used in installations where the space available for the panel to extend laterally of the LCD 36 is restricted.

The light modifying panels have been described as being installed in a particular configuration, but it should be understood that other configurations may also be used. In particular, the as-described panels may be installed in different configurations including rotation of the filter, LCD and pin sockets 90, 180 or 270 degrees, or other orientations. These arrangements permit the installation of a panel of a desired color with little difficulty. Such panels may be kept on hand by manufacturers of LCD's assemblies and installed as prescribed by a particular customer to fulfill color preferences.

Other embodiments of the invention from the specific embodiments disclosed herein will also come to mind to those of ordinary skill in the art falling within the scope of this invention.

What is claimed is:

1. A backlit liquid crystal display assembly comprising a board on which a liquid crystal display is mounted, an opening in said board in alignment with said liquid crystal display, a backlight for shining through said opening, and a light modifying panel interposed between said board and said liquid crystal display to modify a selected characteristic of light rays passing through said liquid crystal display, said panel having securement means in the form of a bent edge portion for selectively securing said panel between said board and said liquid crystal display.

2. An assembly as claimed in claim 1 wherein the surface of said panel adjacent said LCD is coated with a finish that is particularly light reflective as well as partially light transmissive.

3. An assembly as claimed in claim 1 wherein said panel is a sheet material and said securement means comprise outwardly-extending tabs from said sheet material.

4. An assembly as claimed in claim 1 wherein said board has pin sockets on two opposed sides of said opening and said liquid crystal display has pins which are inserted in said sockets, whereby said liquid crystal display straddles said opening.

5. An assembly as claimed in claim 1 wherein said panel includes a pair of opposed edges extending downwardly toward said board on either side of said opening to urge said panel toward said liquid crystal display.

6. An assembly as claimed in claim 4 wherein said panel includes an additional pair of opposed edges extending upwardly into the plane of the liquid crystal display to restrain movement of the panel parallel to said pin sockets.

7. An assembly as claimed in claim 1 wherein said panel is a stiff sheet material having a leading end, a mid-section and a trailing end, the midsection being narrower than the inside distance between said pin sockets and said leading and trailing ends being wider than said distance.

8. An assembly as claimed in claim 7 wherein said leading end has portions which are wider than said midsection, and which are connected by a resilient bend, so that said portions can be bent inwardly to facilitate insertion and withdrawal of said panel between said board and said liquid crystal display.

9. An assembly as claimed in claim 8 wherein said liquid crystal display is spaced from said board by a gap and said portions of said leading end extend toward said pin sockets toward said midsection.

10. An assembly as claimed in claim 4 wherein said panel comprises a rectangular, stiff sheet material slightly wider than the inside distance between said pin sockets, first edge of said panel adjacent one of said pin sockets is downwardly turned toward said board along a resilient bend parallel to said first edge, a second edge of said panel adjacent another of said one of said pin sockets has a leading end, a trailing end and a midsection with divisions separating said forward end from said midsection and said midsection from said trailing end with said midsection downwardly turned toward said board along a resilient bend parallel to said second edge, whereby portions of said leading and trailing ends extend outwardly as tabs in alignment with said another of said one of said pin sockets.

11. An assembly as claimed in claim 10 wherein said panel further comprises an extension on said trailing end and said first edge has a division aligned with the division between the midsection and the trailing end of said second edge, said extension having a resilient bend transverse to the first and second edges and downwardly turned toward said board.

12. An assembly as claimed in claim 1 wherein the selected characteristic is color.

13. As assembly as claimed in claim 1 wherein the selected characteristic is direction.

14. An assembly as claimed in claim 1 wherein the light modifying material is polycarbonate with a reflective coating.

* * * * *

UNITED STATES PATENT AND TRADEMARK OFFICE
CERTIFICATE OF CORRECTION

PATENT NO. : 5,098,179
DATED : 3/24/92
INVENTOR(S) : Winfield F. Turner

It is certified that error appears in the above—identified patent and that said Letters Patent is hereby corrected as shown below:

In column 8, line 1, change "particularly" to --partially--.

Signed and Sealed this

Twenty-second Day of June, 1993

Attest:

MICHAEL K. KIRK

Attesting Officer

Acting Commissioner of Patents and Trademarks